United States Patent [19]
Herzog et al.

[11] Patent Number: 6,047,813
[45] Date of Patent: *Apr. 11, 2000

[54] ACCUMULATING CONVEYOR WITH LATCHABLE PALLETS

[75] Inventors: Hans W. Herzog, Oakland; Kenneth Lingo, Shelby Township; John H. Nolan, Harrison Township, all of Mich.

[73] Assignee: UNOVA IP Corp., Beverly Hills, Calif.

[ * ] Notice: Under 35 U.S.C. 154(b), the term of this patent shall be extended for 265 days.

[21] Appl. No.: 08/938,051

[22] Filed: Sep. 26, 1997

Related U.S. Application Data

[63] Continuation of application No. 08/523,061, Sep. 1, 1995, abandoned.

[51] Int. Cl.[7] .................................................... B65G 47/84

[52] U.S. Cl. ...................................... 198/803.2; 198/465.3

[58] Field of Search .............................. 198/465.1, 465.3, 198/803.01, 803.2, 867.01, 867.13, 867.14

[56] References Cited

U.S. PATENT DOCUMENTS

| | | | |
|---|---|---|---|
| 4,088,220 | 5/1978 | Jacksch et al. | 198/803.2 |
| 4,934,515 | 6/1990 | Linden | 198/803 |
| 5,253,745 | 10/1993 | van den Bergh et al. | 198/803.01 |
| 5,407,058 | 4/1995 | Gyger | 198/465.3 |
| 5,540,319 | 7/1996 | Orisaka et al. | 198/465.3 |

FOREIGN PATENT DOCUMENTS 0462878  12/1991  European Pat. Off. .

*Primary Examiner*—Jospeh E. Valenza
*Attorney, Agent, or Firm*—Reising, Ethington, Barnes, Kisselle, Learman & McCulloch, P.C.

[57] ABSTRACT

An endless accumulating conveyor with upper and lower runs and curved sections at the ends with a plurality of pallet trains each with at least two pallets releasably connected together by a latch at least while the pallet train is advanced over the upper run. The pallets are disconnected as each pallet is advanced around a curved section without being connected to any of the other pallets. The pallets may be held stationary and accumulated while the conveyor continues to run.

36 Claims, 7 Drawing Sheets

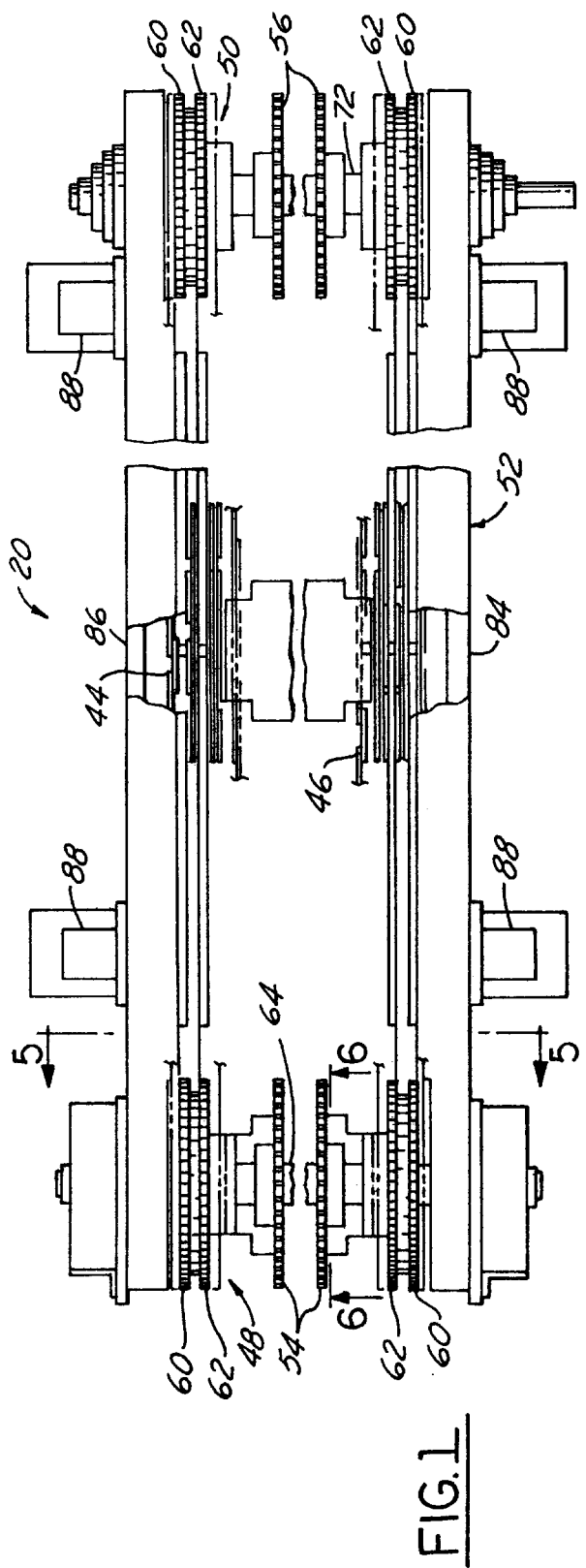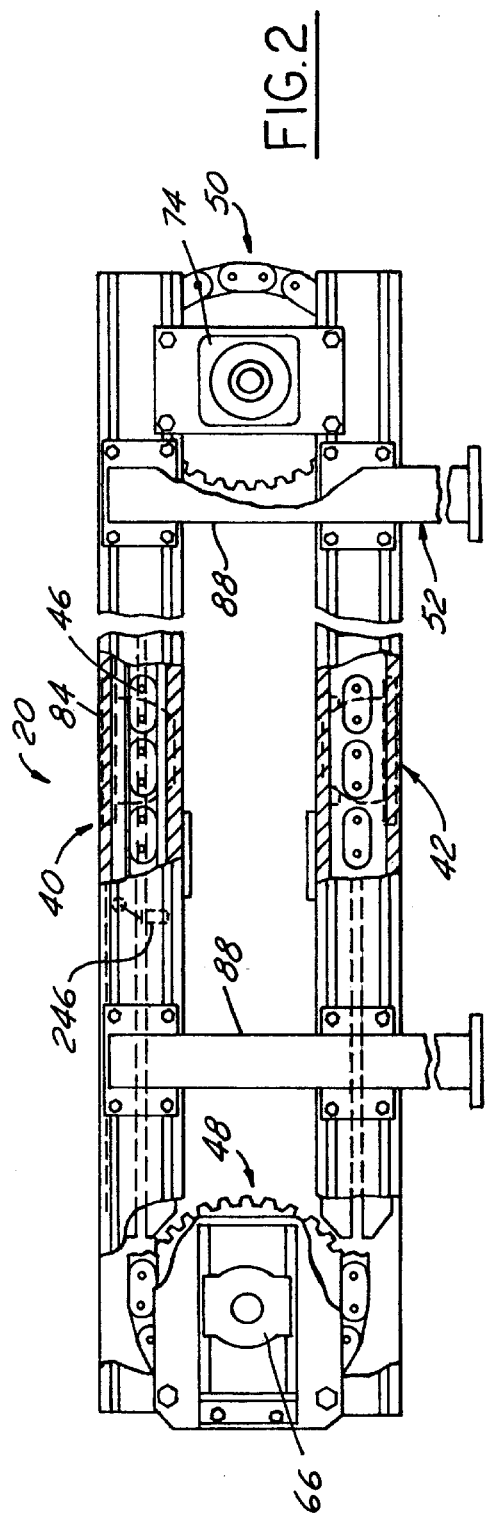

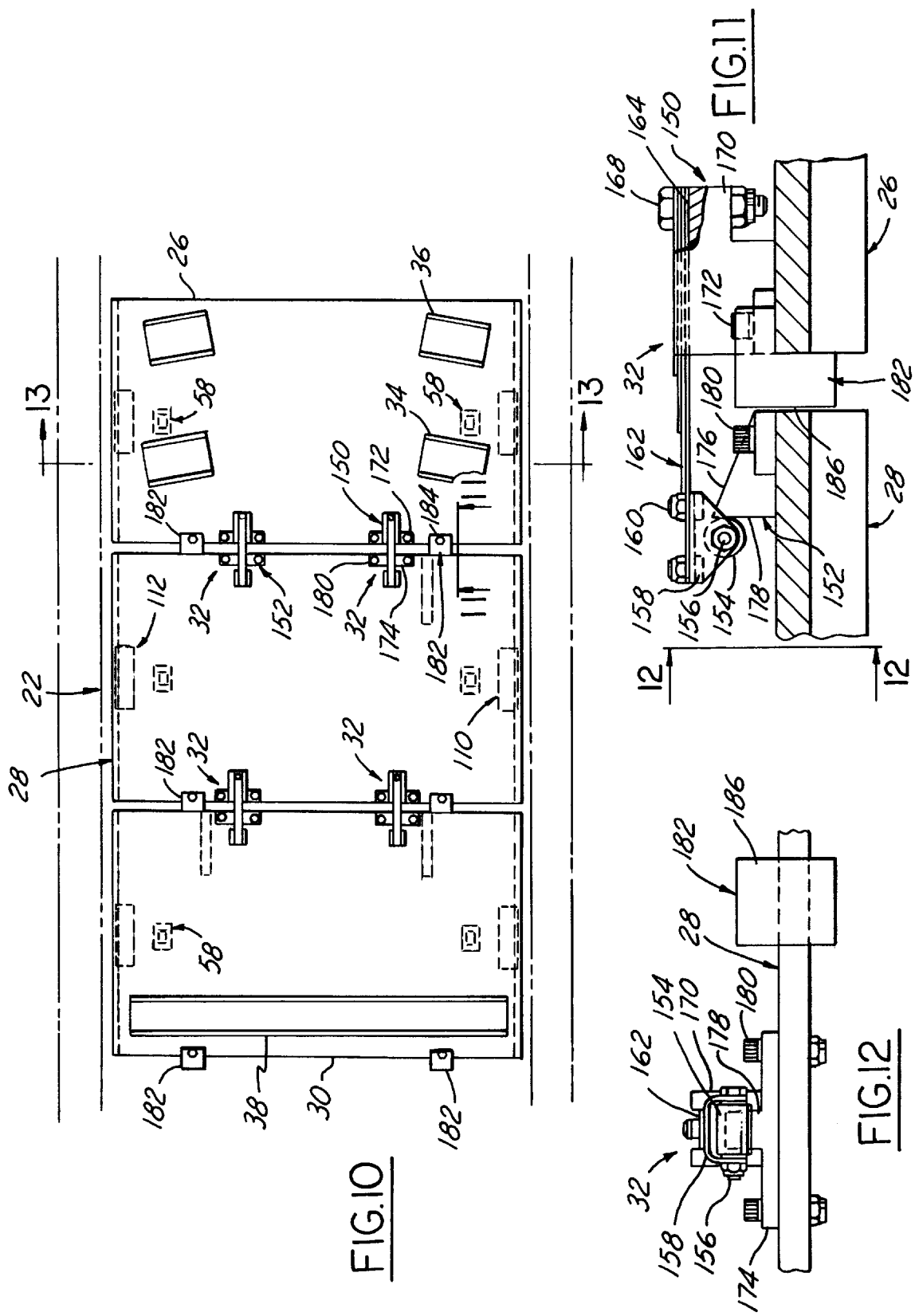

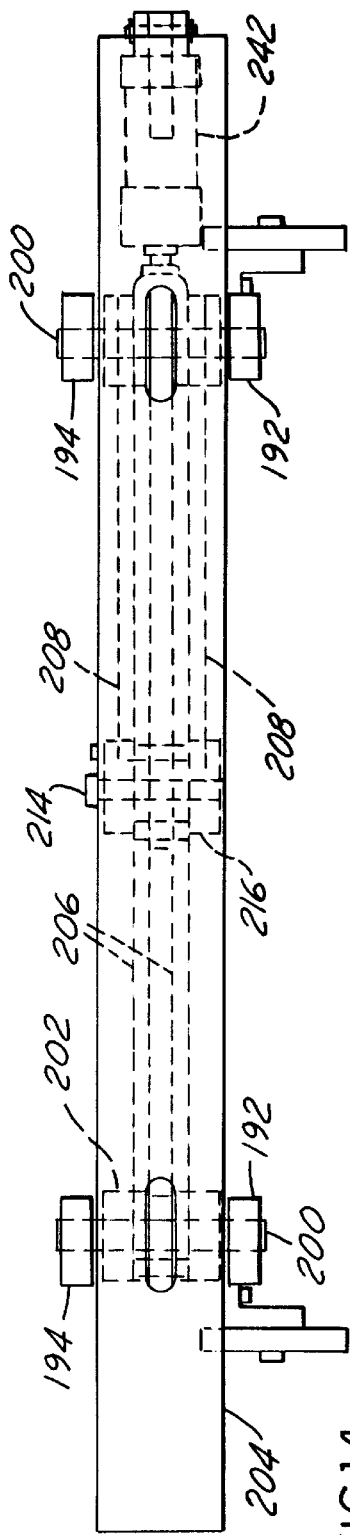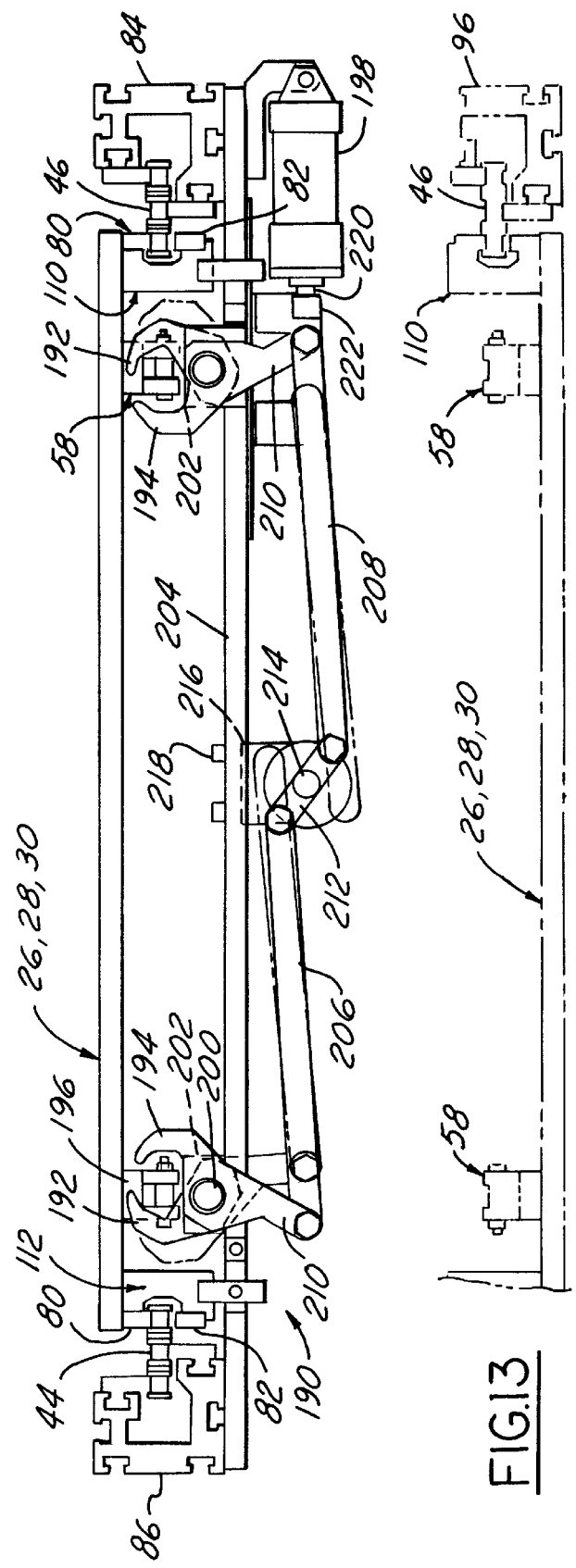

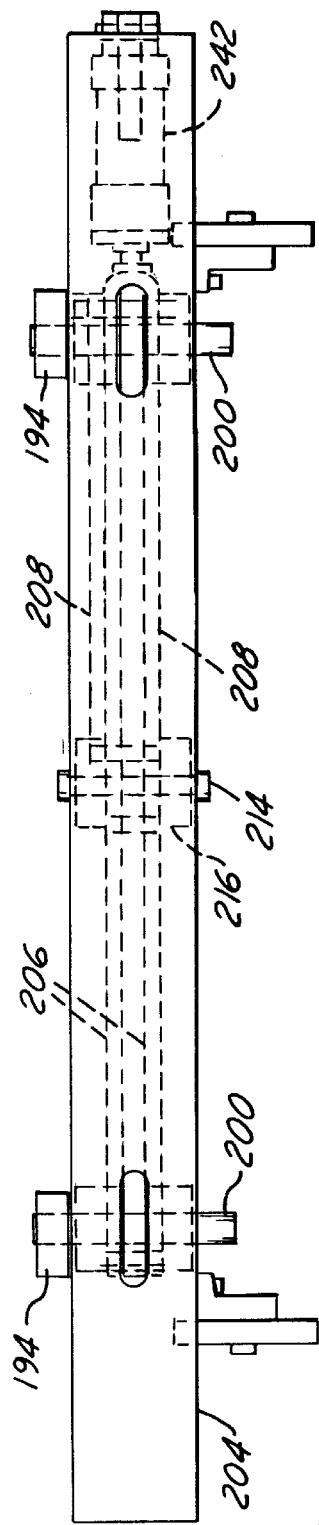
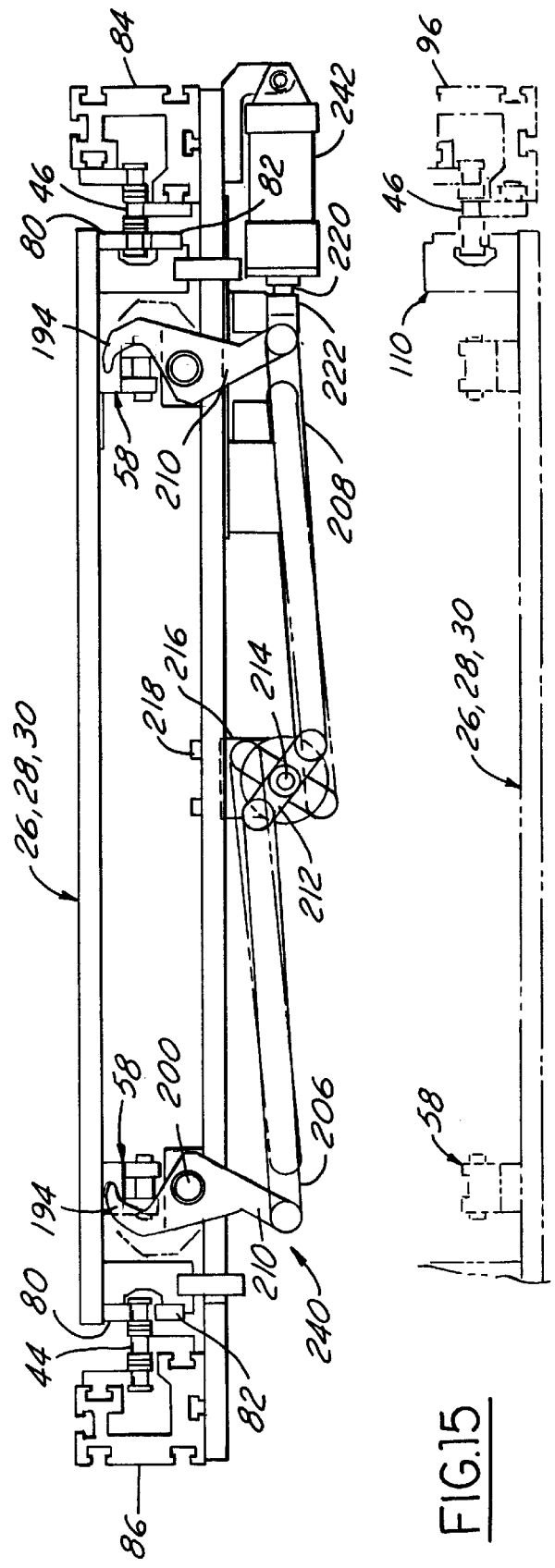

ACCUMULATING CONVEYOR WITH LATCHABLE PALLETS

This application is a continuation of application Ser. No. 08/523,061, filed Sep. 1, 1995, now abandoned.

FIELD OF THE INVENTION

This invention relates generally to accumulating conveyors and more particularly to an endless under/over accumulating conveyor with latchable pallets.

BACKGROUND OF THE INVENTION

Endless accumulating under/over conveyors with upper and lower runs adapted to slidably support pallets and to frictionally transport them over the upper and lower runs have been previously developed. One such conveyor with a drive mechanism for positively advancing pallets from one run to the other over a curved section at each end of the conveyor is disclosed in U.S. Pat. No. 4,934,515.

As a practical matter, in this type of conveyor, the maximum length of the pallet in its direction of travel along the run is limited by the need to advance each pallet over the curved sections at the end of the conveyor. The maximum length of a pallet often limits the maximum length or size of a workpiece that can be carried by the pallet. To permit carrying longer workpieces, U.S. Pat. No. 5,407,058 and EPO Patent 0 462 878A1 disclose a conveyor with pallet trains of two more succeeding pallets permanently connected together by links pivoted at each end to an adjacent pallet.

SUMMARY OF THE INVENTION

It has been discovered that even with this linked pallet arrangement, there are significant problems and practical limitations on the length of each connected pallet and the links and pivot points, and hence the length of the overall pallet train due to both the drive positively advancing the pallets around the curved sections at the ends of the conveyor and the kinematics of the pallet train and links advanced by the drive which results in a significant variation of the linear velocity of each pallet of the train as it proceeds around a curved section.

This invention obviates these problems in endless accumulating conveyors with upper and lower runs and a plurality of support pallets. Two or more of the pallets are releasably latched together to advance in a pallet train or unit over the upper run and unlatched to be individually advanced around the curved section at the ends of the conveyor by a positive drive mechanism. Any number of pallets can be releasably latched together to provide a pallet train of sufficient overall length to accommodate a workpiece of any linear length. Preferably, each latch has a clasp adjacent the trailing end of a leading pallet which becomes engaged with a catch adjacent the leading end of an immediately succeeding pallet only after both pallets have been advanced over a curved conveyor section from one run to the other, and the clasp is disengaged from the catch by initial advancement of its associated pallet over a curved section.

In a pallet train, the first or leading pallet has only a clasp and no catch thereon, the trailing last pallet has only a catch but no clasp thereon, and each intermediate pallet has a catch adjacent its front end and a clasp adjacent its back end. Since each pallet is unlatched when positively advanced by a drive around a curved section, the variation in its linear velocity does not adversely affect either its being advanced over the curved section or the other pallets.

Objects, features and advantages of this invention are to provide an endless accumulating conveyor with a plurality of pallet trains for carrying workpieces in which the pallets are releasably coupled together when advanced along at least one run and are disconnected when positively advanced over a curved section at an end of the conveyor, is more versatile, readily accommodates a wide variety of workpieces of differing lengths, provides an easier and smoother transition to and advancement of each pallet over a curved conveyor section, and is of relatively simple design, economical manufacture and assembly, rugged, durable, reliable and in service has a relatively long useful life and requires relatively little service, maintenance and repair.

BRIEF DESCRIPTION OF THE DRAWINGS

These and other objects, features and advantages of this invention will be apparent from the following detailed description of the Presently preferred embodiment and best mode, appended claims, and accompanying drawings in which:

FIG. 1 is a fragmentary top view with portions broken away and in section of an endless accumulating conveyor embodying this invention;

FIG. 2 is a fragmentary side view with portions broken away and in section of the conveyor of FIG. 1;

FIG. 10 is an enlarged fragmentary top view taken generally on line 10—10 of FIG. 4 of a pallet train of three pallets latched together and received on the upper run of the conveyor;

FIG. 11 is an enlarged and fragmentary sectional view taken generally on line 11—11 of FIG. 10 and illustrating a latch coupling together adjacent pallets;

FIG. 12 is a fragmentary sectional view taken generally on line 12—12 of FIG. 7 and providing an end view of the latch;

FIG. 13 is a enlarged sectional view taken generally on line 13—13 of FIG. 10 and illustrating an escapement mechanism of the conveyor;

FIG. 14 is a top view of the escapement mechanism of FIG. 13;

FIG. 15 is an enlarged sectional view taken generally on line 15—15 of FIG. 1 and illustrating another escapement mechanism of the conveyor;

FIG. 16 is a top view of the escapement mechanism of FIG. 15;

DETAILED DESCRIPTION

Figure 3:
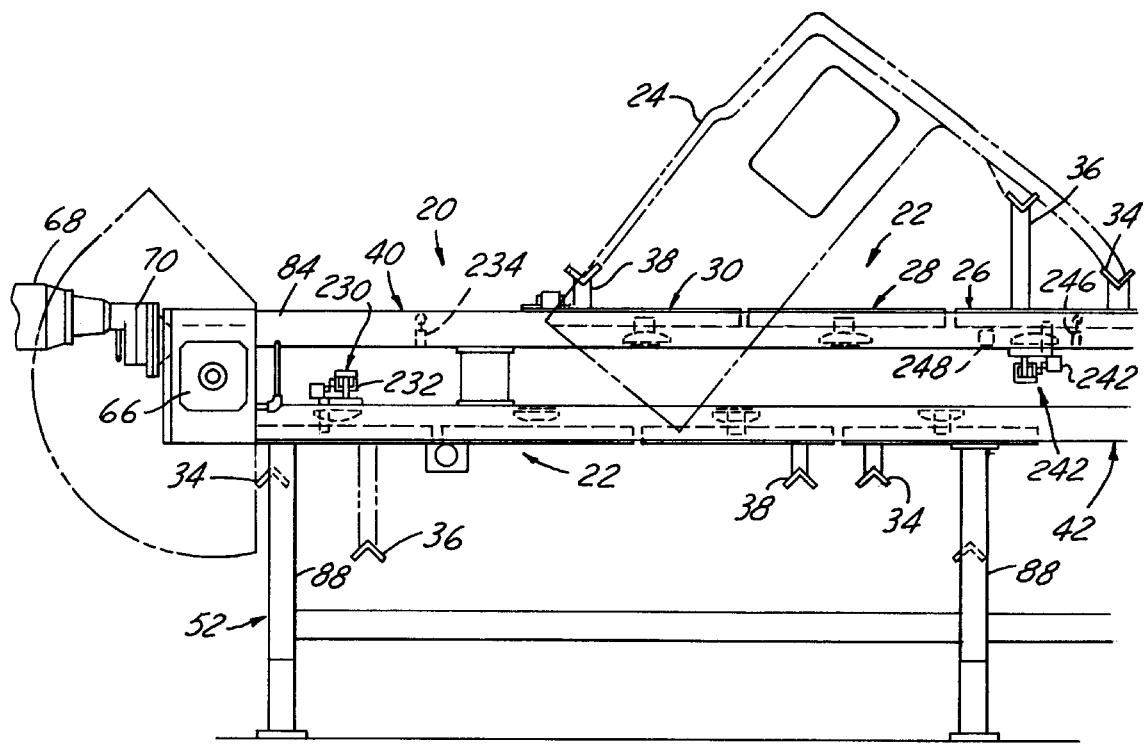
FIG. 3 is an enlarged and fragmentary side view of the conveyor adjacent its upstream end.

Referring in more detail to the drawings, FIGS. 1–4 illustrate a conveyor 20 embodying this invention with a plurality of pallet trains 22 carrying workpieces 24, such as a subassembly of body panels of a cab for a truck vehicle. Each pallet train 22 has a leading pallet 26, at least one intermediate pallet 28 and a trailing last pallet 30 releasably coupled together by latches 32. Each workpiece 24 is carried on a pallet train 22 by a pair of nests 34 and 36 fixed to the first pallet 26 and a nest 38 fixed to the last pallet 30.

The pallets are advanced along upper and lower runs 40 & 42 by a pair of laterally spaced apart three strand endless roller chains 44 & 46 received on sprocket assemblies 48 and 50 mounted on a frame 52 adjacent the ends of the conveyor. The pallets are individually positively advanced around each end of the conveyor from one run to the other by propelling sprockets 54 & 56 and cooperating dog assemblies 58 on the underside of each pallet.

Figure 5:
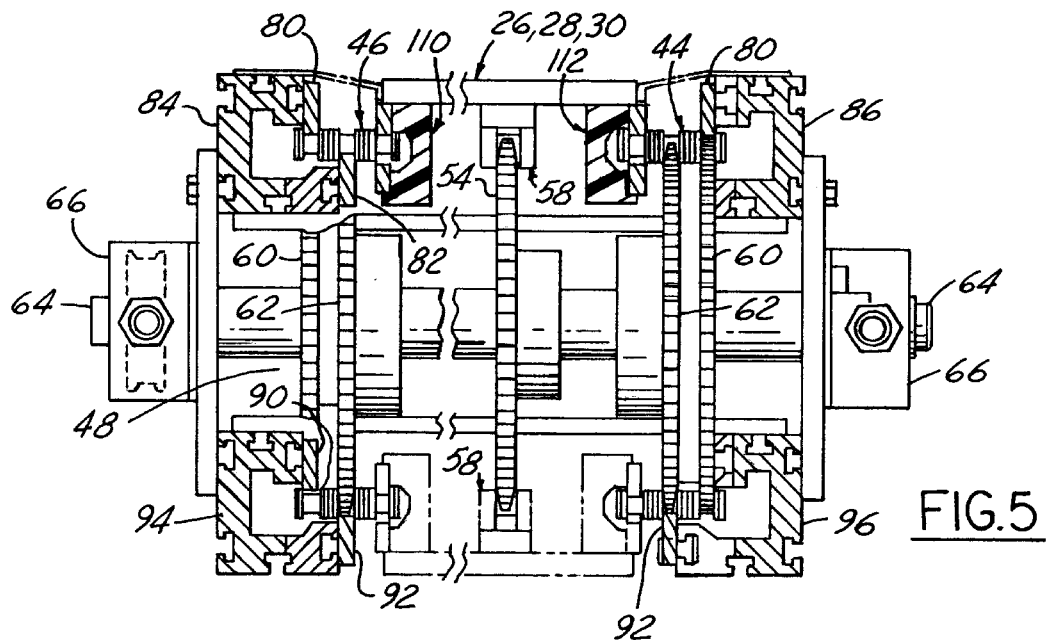
FIG. 5 is a fragmentary sectional view taken generally on line 5—5 of FIG. 1.

As shown in FIGS. 1 and 5, the sprocket assembly 48 has two pairs of sprockets 60 & 62 which mesh with the outer and center strands of the roller chains 44 & 46 and are keyed to a drive shaft 64 journalled for rotation in bearing blocks 66 attached to the sides of the frame 52 of the conveyor. The pallet drive sprocket 54 is also keyed to the shaft 64 for rotation in unison with the chain sprockets 60 & 62. The chains are driven through a conventional electric motor 68 (FIG. 3) coupled to the drive shaft 64 through a speed reducer 70. Similarly, the sprocket assembly 50 has two pairs of sprockets 60 and 62 meshed with the outer and center strands of chains 44 & 46 and keyed to a shaft 72 journalled in bearing blocks 74 slidably mounted in conventional chain tensioning devices 76 secured to the sides of the conveyor frame. The pallet propelling sprocket 56 is also keyed to the shaft 72 for rotation in unison with the chain sprockets 60 & 62.

As shown in FIGS. 2 and 5, the upper runs of chains 44 and 46 are supported by guide bars 80 & 82 slidably bearing on the outer and middle strands of the chains, extending longitudinally horizontally and parallel to one another between and terminating immediately adjacent their associated chain sprockets 60,62 adjacent the opposed ends of the conveyor. These guide bars are secured to longitudinally extending upper carrier rails 84 and 86 fixed to upstanding legs 88 of the frame 52 of the conveyor. Similarly, the lower runs of the chains 44 and 46 are supported by guide bars 90 & 92 slidably bearing on the outer and middle strands of the chains, extending longitudinally horizontally and parallel to one another between and terminating adjacent their associated chain sprockets. These guide bars are secured to longitudinally extending lower carrier rails 94 & 96 fixed to the upstanding legs 88 of the frame.

Figures 6, 7:
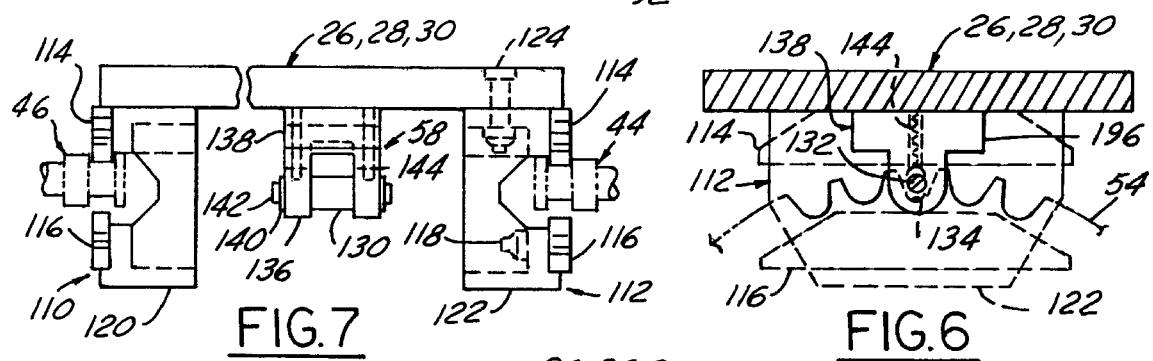
FIG. 6 is a fragmentary sectional view taken generally on line 6—6 of FIG. 1 and illustrating some of the mechanism for positively advancing a pallet over a curved section of the conveyor.
FIG. 7 is a fragmentary end view of a pallet of the conveyor.
Figure 8:
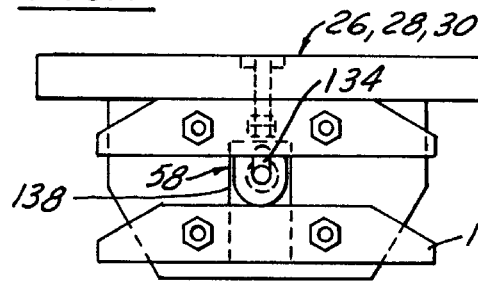
FIG. 8 is a side view of the pallet of FIG. 7.
Figure 9:
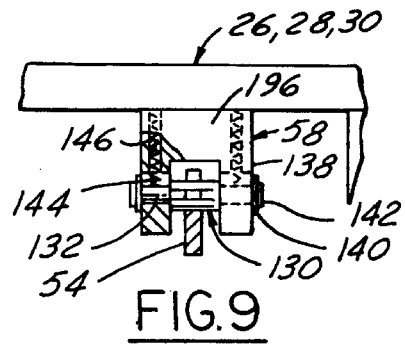
FIG. 9 is a fragmentary end view of the pallet with a portion of a dog broken away and in section.

As shown in FIGS. 5–7, the pallets 26, 28 and 30 are slidably supported on the upper and lower runs of the roller chains 44 & 46 for advancing the pallets along the upper and lower runs of the conveyor. Each pallet is supported by a pair of spaced apart shoes 110 and 112 with vertically spaced apart upper and lower guide bars 114 and 116 secured by cap screws 118 to mounting blocks 120 & 122 which are attached to the pallet by cap screws 124. When the pallet is on the upper run, the guide bars 114 bear on and frictionally engage the chains and on the lower run the guide bars 116 bear on and frictionally engage the chains. To permit each pallet to freely move around the curved sections without binding on the chains, the lower guide bars have mitered corners 126. These shoes loosely retain each pallet on the roller chains which pass between the guide bars 114 & 116 so that the pallets will be guided by and not disengaged from the chains as they are advanced around the curved sections of the conveyor.

Each pallet is positively advanced around each curved section of the conveyor by engagement and cooperation of its dog assemblies 58 on the underside of the pallet with the propelling sprockets 54 and 56 at the upstream and downstream ends respectively of the conveyor. As shown in FIGS. 5–9, each dog assembly 58 has at least one transverse pin 130 engagable between any two succeeding teeth of the cooperating propelling sprockets with reduced diameter end portions 132 slidably received in vertically elongate slots 134 through spaced apart arms 136 of a clevis bracket 138 secured to the underside of the pallet so that the pin 130 extends transversely of the pallet and preferably its axis is located midway between the leading and trailing edges of the pallet. The pin 130 is slidably retained in the slots 134 by a washer 140 and a cap screw 142 threaded into each end of the pin. The pin is yieldably biased towards its extended position by a pair of compression springs 144 received in bores 146 through the bracket and opening into the upper ends of the slots. The pin 130 is spring loaded so that if engaged by the end of a tooth of the propelling sprocket 54 or 56 it will yield and slide over the tooth and drop into a space between adjacent sprocket teeth. As each pallet is advanced around a curved section of the chain by the cooperation of its dog assemblies 58 and associated sprockets 54 or 56, its associated guide bars 114, 116 retain the pallet on the chains with the pins 130 engaged by the sprockets 54 or 56 while still permitting the pallet to move freely around the curved section without the guide bars binding on the curved chains.

To the extent described above, the construction and operation of the conveyor 20 is substantially the same as the conveyor disclosed and claimed in U.S. Pat. No. 4,934,515 issued on Jun. 19, 1990, the disclosure of which is incorporated herein by reference.

Figure 4:
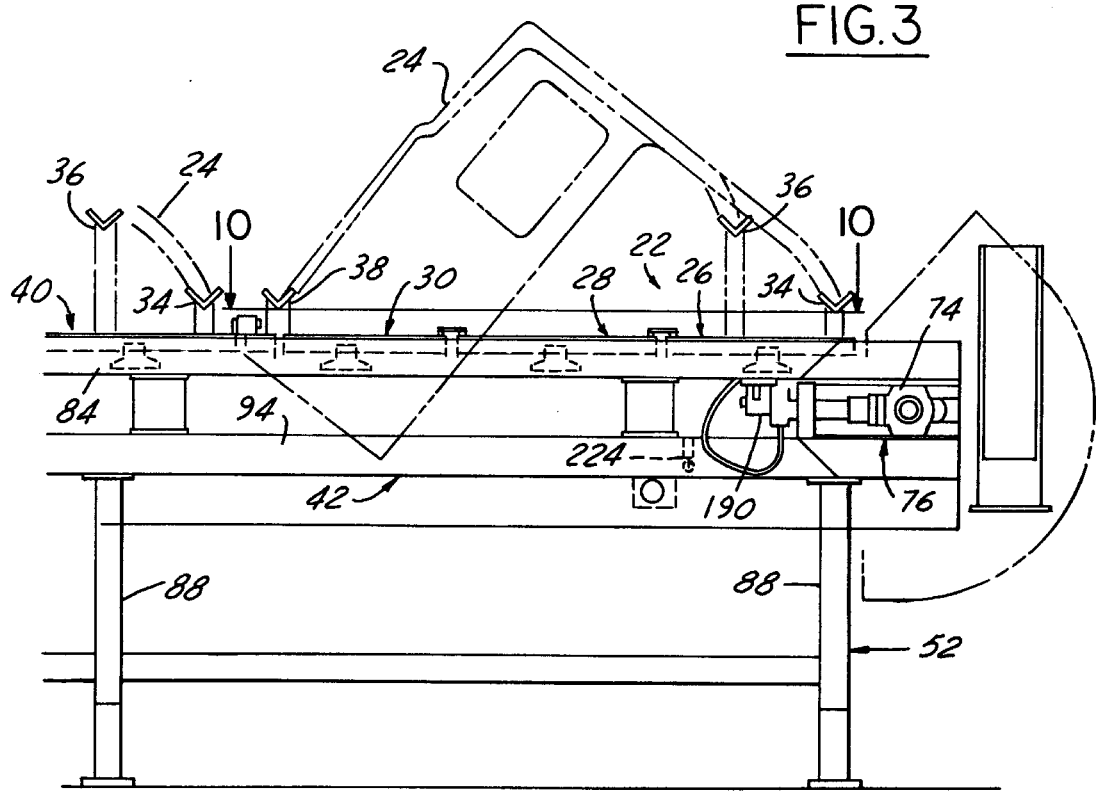
FIG. 4 is an enlarged and fragmentary side view of the conveyor adjacent its downstream end.

In accordance with this invention, and as shown in FIGS. 3, 4 & 10, the adjacent individual pallets of each pallet train 22 are releasably connected together by latches 32 for carrying a workpiece 24 along the upper run of the conveyor. Each latch 32 has both a clasp assembly 150 and a cooperating catch 152. For each pallet train 22, a pair of clasp assemblies 150 are mounted adjacent the trailing end of the first or leading pallet 26 and each intermediate pallet 28 and complimentary catches 152 are mounted adjacent the leading edge of each intermediate pallet 28 and the trailing last pallet 30. For some applications, each pallet train may have only two pallets, namely, a leading pallet 26 and a trailing last pallet 30 with no intermediate pallets. If the pallets are of sufficient transverse width, it may be preferable, as shown in FIG. 10, to utilize two latches 32 laterally spaced apart from the longitudinal center line of the pallets.

As shown in FIGS. 11 and 12, each clasp or hook assembly 150 has a roller 154 journalled for rotation on the shank of a bolt 156 received in the legs of a U-shaped bracket mounting 158 secured by bolts 160 to the free end of a leaf spring assembly 162 which preferably has a plurality of leaves. The leaf spring 162 is received in a slot 164 in a bracket 166 and secured to the bracket by a bolt 168.

The bracket 170 is secured to a pallet by screws 172. Preferably, the catch 32 has a block 174 with an inclined ramp 176 and a generally vertical abutment 178, and is secured by cap screws 180 on the upper face and adjacent the leading edge of the last pallet 30 and each intermediate pallet 28 of each pallet train.

To maintain the spacing between adjacent pallets, a pair of generally L-shape bumpers or spacer blocks 182 are disposed over the trailing end of each pallet and secured to the upper face of the pallet by a cap screw 184. Each spacer block has an end face 186 disposed to bear on the leading edge of an immediately succeeding pallet. Preferably, when the latches are engaged, there is a slight clearance between the end face 186 of the associated spacer block 182 and the immediately succeeding pallet which is typically about 0.03 of an inch.

Adjacent the downstream end of the upper run of the conveyor, the pallets are released one at a time by an escapement mechanism 190 for being positively advanced around the curved section from the upper to the lower run by the cooperation of the dogs 58 of the released pallet with the propelling sprocket 56. As shown in FIGS. 13 and 14, the escapement mechanism 190 has a pair of first fingers 192 and a pair of second fingers 194 which cooperate with abutments 196, provided by the mounting blocks 138 of the dogs 58 on each pallet, to release the leading pallet on the top run and stop the immediately succeeding pallet when the mechanism is cycled by a drive cylinder 198. The pairs of fingers 192 and 194 are angularly spaced apart and secured to shafts 200 journalled for rotation in blocks 202 fixed to a mounting plate 204 of the escapement which is secured to the carrier rails 84 & 86. The fingers are operably connected with the drive cylinder by first and second links 206 and 208 each pivotally connected at one end to actuator arms 210 fixed to the shafts 200 and at the other end pivotally connected to a third link 212 journalled for rotation at its midpoint on a pin 214 secured in mounting blocks 216 fixed to the plate 204 by cap screws 218. The piston rod 220 of the cylinder 198 is also pivotally connected by a device 222 along with the link 208 to the actuator arm 20 of one of the shafts 200.

As shown in FIG. 13, when the piston rod 220 is in the retracted position, the first fingers 192 are disposed in the path of the blocks 138 of the dogs 58 of the leading pallet to stop and retain it and the second fingers 194 are retracted from the path of travel of the blocks. When the cylinder 198 is energized to advance its piston rod 220, the first fingers are retracted as indicated in phantom to disengage and release the leading pallet which is advanced by the conveyor chains toward the curved end section and the propelling sprocket 56, and the second fingers 194 are advanced into the path of the stop blocks 138 of the dogs 58 of the immediately succeeding pallet to retain it while the released pallet is advanced around the curved section by the propelling sprocket 56. Preferably, a limit switch 224 (FIG. 4) adjacent the lower run is tripped by a released pallet when it has been completely advanced around and cleared the curved section to provide a control signal which inhibits actuation of the escapement 190 until the released pallet trips the limit switch 224 and hence has cleared the curved section so that another pallet may be released by the escapement. This avoids any jamming of the pallets and malfunction of the conveyor.

The pallets are advanced on the lower run by the chains 44, 46 and, as shown in FIG. 3, accumulate behind another escapement mechanism 230 which controls the release of one pallet at a time for positive advancement by the propelling sprocket 54 around the curved section of the chains at the upstream end of the conveyor and onto the upper run of the conveyor. Preferably, this escapement 230 has essentially the same construction and arrangement and operates in the same manner as the escapement 190 and hence will not be described in detail. This escapement 230 has a separate drive cylinder 232 which cycles the first and second fingers 192 and 194 to release one pallet at a time and retain the immediately succeeding pallet while the released pallet is advanced around the curved sections by the propelling sprocket 54. Preferably, a limit switch 234 adjacent the upper run is tripped by each pallet after it has been completely advanced by sprocket 54 around the curved portion of the chain and received on the upper run to provide a signal which inhibits premature release of a succeeding pallet by the escapement mechanism 230, and thereby avoids any jamming of the pallets or malfunctioning the conveyor.

Along the upper run, and sufficiently downstream to accumulate all of the pallets of a pallet train 22, another escapement mechanism 240 releasably stops the first pallet of a train at least long enough for all of the pallets of the train to be advanced sufficiently along the upper run so that their associated latches engage and couple together all of the pallets of the train. For example, as shown in FIG. 3, the lead, intermediate and last pallets 24, 26 and 28 of the train 22 are releasably retained by the escapement 240.

As shown in FIGS. 15 and 16, the escapement 240 has essentially the same construction and arrangement as the escapement 190 except that it has one set of fingers 194 on the pivot shafts 200 which are actuated by its drive cylinder 242. As shown in FIG. 15, when the rod 220 of the cylinder 242 is retracted, the fingers 194 project into the path of the stop blocks 138 of dogs 58 of the lead pallet 26 of the train and when engaged by the fingers the lead pallet is stopped and prohibited from being advanced by the moving roller chains until the piston rod 244 of the cylinder 242 is advanced to retract the fingers 194 from the path and thereby permit the lead pallet and all succeeding pallets of the train to be advanced by the moving chains past the escapement. Preferably, a limit switch 246 sufficiently downstream from the escapement 240 senses when all of the pallets of the train have been advanced sufficiently by the moving chains so that the last pallet of the train is downstream of the escapement 240 to provide a signal inhibiting premature cycling of the escapement 240 and hence stopping of the released pallet train and malfunctioning of the conveyor.

Figure 17:
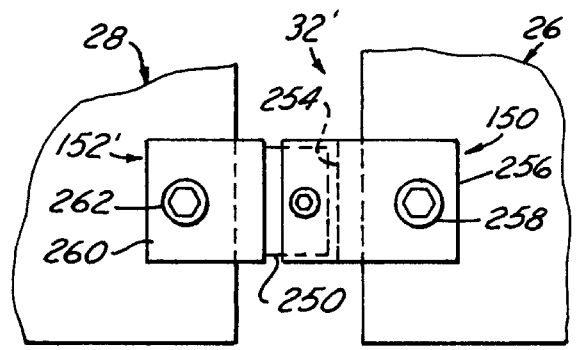
FIG. 17 is a fragmentary top view of a modified latch coupling together adjacent pallets received on the top run of the conveyor.
Figure 18:
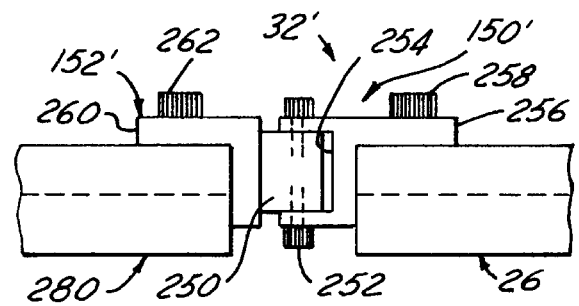
FIG. 18 is a fragmentary side view of the modified latch and adjacent pallets of FIG. 17.
Figure 19:
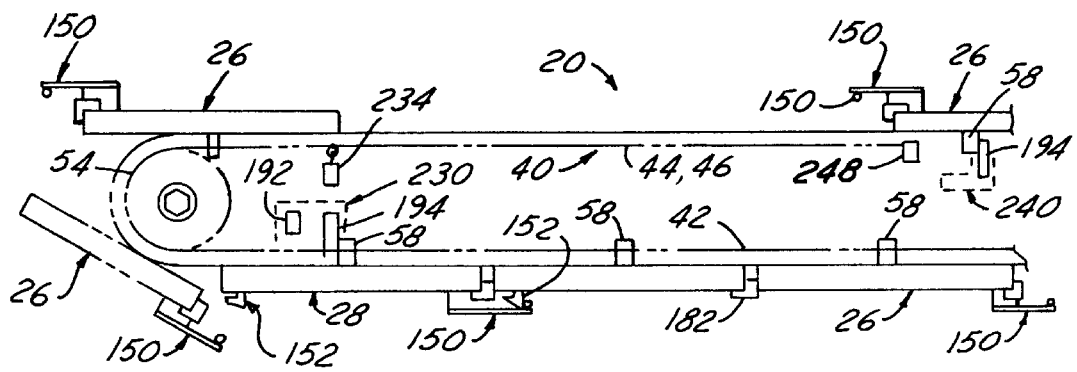
FIG. 19 is a sem-schematic side view illustrating the advancement of pallets over the curved section of the upstream end of the conveyor.

FIGS. 17 & 18 illustrate a modified latch 32' releasably coupling a leading pallet 26 with an intermediate pallet 28. The latch 32' has a magnetic clasp 150' engagable with a catch 152' of a ferro-magnetic material such as iron. The clasp 150' has a permanent magnet 250 pivotally mounted by cap screws 252 in a recess 254 in a mounting bracket 256 secured by a cap screw 258 to the leading pallet 26 adjacent its trailing edge. The pivotal mount of the magnet accommodates any misalignment of adjacent pallets to insure a good magnetic coupling with the clasp 152'. The clasp 152' is an L-shape block 260 of iron secured by a cap screw 262 to the intermediate pallet 28 adjacent its leading edge.

Operation

For simplicity in describing the operation of the conveyor 20, it is assumed that initially there are no workpieces 24 on any of the pallet trains 22, no pallet is retained by the pallet train escapement 240 which has its fingers 194 extended to stop a pallet, and the escapement 230 is retaining a leading pallet 26 of a pallet train 22 with its stop fingers 192 extended and fingers 194 retracted. Additional pallets are accumulated in sequence behind the escapement 230. The drive motor 68 is energized to continuously drive or advance the roller chains 44, 46 and rotate the propelling sprockets 54,56. The escapement 230 is actuated by energizing its cylinder 198 to release one pallet (a leading first pallet 26) which is advanced by the moving chains and retain the immediately succeeding pallet (an intermediate pallet 28). As the released leading pallet advances its associated dogs 58 engage the propelling sprockets 54 which positively advance the pallet around the curved end of the conveyor and onto the upper run of the chains. As shown in FIG. 17, as the released first pallet initially starts around the curved section, its associated clasp 150 swings outwardly in an arcuate path away from the catch 152 of the succeeding intermediate pallet 28 and disengage from the catch. Simultaneously, this intermediate pallet is advanced by the chains until it is stopped by the second fingers 194 of the escapement 230 whereupon it is retained by the escapement. Once the released first pallet 26 is deposited on the upper run, it is advanced by the moving chains past the limit switch 234 and into engagement with the fingers 194 of the escapement 240 which stops and retains it. Tripping of the "pallet clear" limit switch 234 produces a signal which actuates the escapement 230 to release the intermediate pallet 28 and retain the immediately succeeding last pallet 30 of the train while the released intermediate pallet is positively advanced around the curved section of the chains by the cooperation of its dogs 58 with the sprockets 54 and onto the upper run where it is advanced by the roller chains past the limit switch 234 and into coupling engagement with the first pallet 26 retained by the escapement 240. As the intermediate pallet approaches the lead first pallet 26 retained by the escapement 240, the ramp 176 of its catch 152 engages the roller 154 of the clasp 150 of the lead first pallet 26 and cams it upwardly against the bias of the spring 162 until the roller passes over the upper end of the ramp and is urged downwardly by the spring into overlapping engagement with the rear edge abutment 178 of the catch to couple together the lead and intermediate pallets.

When the intermediate pallet trips the "pallet clear" limit switch 234, it produces a signal which actuates the escapement 230 to release the trailing last pallet 30 of the train and stop and retain the succeeding first pallet 26 of the immediately succeeding pallet train 22. This released last pallet 30 is initially advanced by the roller chains and then positively advanced around the curved section of the roller chains by the engagement of its dogs 58 with the sprockets 54 and deposited on the upper run where it is advanced by the roller chains past the limit switch 234 and into coupling engagement with the intermediate pallet. As the trailing or last pallet 30 approaches the intermediate pallet, the clasp roller 154 of the intermediate pallet engages the catch ramp 176 of the last pallet and passes over the upper end of the ramp 176 and vertically downward into overlapping engagement with the rear abutment 178 of the catch to couple the last pallet to the intermediate pallet and thereby complete the first train of coupled pallets. After this first train has been completed, and before it is released by the escapement 240, a workpiece 24 is loaded onto this pallet train and into the retainer nests 34,36,38 mounted on the first and last pallets of this train. Thereafter, the escapement 240 is actuated to release this first train which is advanced by the roller chains along the upper run and downstream of the escapement 240. When the leading pallet 26 of this train actuates the limit switch 246, it produces a signal which initiates actuation of the escapement 240 to advance its fingers 194 to retain the leading pallet of an immediately succeeding train. This cycle is repeated to transfer one pallet at a time from the lower run, around the curved section and onto the upper run, and to couple together with the latches 32 the leading, intermediate and trailing pallets 26,28,30 of another train 22 to receive another workpiece 24.

Preferably, upon each startup of the conveyor, a pallet identification switch 248, such as a proximity switch, determines whether the first pallet retained by the escapement 240 is a lead pallet 26 of a train. If it is not, the proximity switch generates a signal which actuates the escapement 240 to an open position to release this pallet and then to a closed position to retain an immediately succeeding second pallet. The pallet identification switch 248 then determines whether this succeeding second pallet is a lead pallet 26 of a train and, if not, actuates the escapement 240 to open and release it and then to close for receiving an immediately succeeding third pallet. The pallet identification switch 248 then determines whether this succeeding third pallet is a lead pallet 26 of a train. Through appropriate circuitry, if none of these first three pallets is a lead pallet 26, it produces a fault signal and shuts down the conveyor. However, if it identifies a lead pallet 26, it is retained by the escapement 240 to be coupled with succeeding intermediate and rear pallets 28,30 to form a complete train 22 of pallets for receiving a workpiece.

Figure 20:
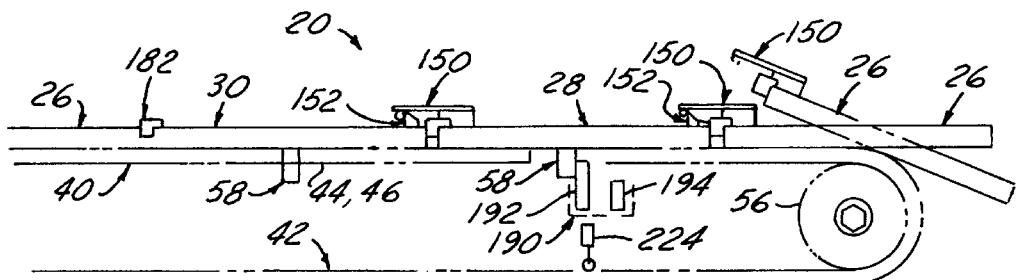
FIG. 20 is a semi-schematic side view illustrating the advancement of pallets over the curved section of the downstream end of the conveyor.

The leading pallet train 22 with a workpiece 24 thereon is advanced by the roller chains until it is stopped by the fingers 192 of the escapement 190. While stopped, the workpiece is removed manually or automatically from the train of pallets unless earlier removed upstream of the escapement 190. A signal is produced, such as by automatically tripping a limit switch or manually actuating a switch, which then cycles the escapement 190 to release one pallet and retain an immediately succeeding pallet. The released pallet is advanced by the roller chains so that its dogs 58 engage with the sprockets 56 to positively advance the released pallet around the curved section of the chain and deposit it on the lower run. As shown in FIG. 20, as the released pallet is initially advanced around the curved section, if it has a clasp 150 its roller 154 swings in an arcuate path upwardly away from the catch 152 on the immediately succeeding pallet retained by the escapement 190 and disengages from it so that the released pallet is individually advanced around the curved section and deposited on the lower run whereupon it is advanced by the moving chains past the limit switch 224 and toward the escapement 230. Tripping the "pallet clear" limit switch 224 actuates the escapement 190 to release the next pallet and retain the immediately succeeding pallet. Each tripping of the limit switch 224 by a pallet produces a signal which initiates a repetition of this cycle to release, uncouple and transfer from the upper to the lower run another pallet after the workpiece has been removed from its pallet train.

What is claimed is:

1. An endless accumulating conveyor comprising, laterally spaced apart and parallel linear members providing an upper run and a lower run, curved sections at the ends of the runs to provide a continuous path with return bends for pallets to move in an arcuate path from one run to the other, a plurality of pallet trains each for carrying a workpiece and each having at least a leading first pallet and a trailing last pallet, a first workpiece support on the first pallet, a second workpiece support on the last pallet and the first and second supports together carrying the same workpiece on one train of pallets with the workpiece having a length greater than the length of any one pallet, each pallet being movably supported on said linear members and each adapted to be advanced along said upper and lower runs and in an arcuate path around the curved sections, adjacent each curved section a propelling mechanism for positively engaging and positively advancing without slippage therebetween the pallets one at a time around the adjacent curved section from one run to the other, a clasp carried by the first pallet of each pallet train, a catch releasably engagable with a clasp and carried by the last pallet of each train, each clasp being constructed so that it engages with the catch carried by an immediately succeeding pallet to couple the pallets together as their associated train is advanced along at least one of the runs for carrying a workpiece, and each clasp and catch being constructed so that as each pallet having a clasp is initially advanced by the propelling mechanism around one of the curved sections it disengages from the catch of the immediately succeeding pallet and as each pallet is advanced in an arcuate path around a curved section it is disconnected from all other pallets and is the only pallet being moved by its associated propelling mechanism around the curved section.

2. The conveyor of claim 1 which also comprises for each pallet train at least one intermediate pallet received between the first and the last pallets of the train, a clasp carried by each intermediate pallet and a catch carried each intermediate pallet.

3. The conveyor of claim 1 wherein the clasp carried by each first pallet is disposed adjacent the trailing edge thereof and the catch carried by each last pallet is disposed adjacent the leading edge thereof.

4. The conveyor of claim 1 which also comprises an escapement mechanism immediately adjacent the lower run and upstream of and adjacent a curved section, and constructed and arranged to release one pallet at a time for being advanced around the adjacent curved section while retaining an immediately succeeding pallet while the released pallet is being advanced completely around the adjacent curved section.

5. The conveyor of claim 4 which also comprises a stop mechanism immediately adjacent the upper run and downstream from the aforementioned curved section and constructed and arranged to releasably stop the first pallet of each train while all succeeding pallets of such train become coupled therewith by their associated catches and latches and thereafter to release the first pallet to permit the entire pallet train to be advanced downstream of the stop mechanism.

6. The conveyor of claim 5 which also comprises a second escapement mechanism immediately adjacent the upper run and upstream of and adjacent an associated curved section and constructed and arranged to release one pallet at a time to be advanced around the associated curved section while retaining an immediately succeeding pallet at least until the released pallet has been advanced completely around the associated curved section.

7. The conveyor of claim 4 which also comprises a second escapement mechanism immediately adjacent the upper run and upstream of and adjacent an associated curved section and constructed and arranged to release one pallet at a time to be advanced around the associated curved section while retaining an immediately succeeding pallet at least until the released pallet has been advanced completely around the associated curved section.

8. The conveyor of claim 1 which also comprises an escapement mechanism immediately adjacent the upper run and upstream of and adjacent an associated curved section and constructed and arranged to release one pallet at a time to be advanced around the associated curved section while retaining an immediately succeeding pallet at least until the released pallet has been advanced completely around the associated curved section.

9. An endless accumulating conveyor comprising, laterally spaced apart and parallel linear members providing an upper run and a lower run, curved sections at the ends of the runs to provide a continuous path for pallets a plurality of pallet trains each for carrying a workpiece and each having at least a leading first pallet and a trailing last pallet, each pallet being movably supported on said linear members and each adapted to be advanced along said upper and lower runs and around the curved sections, adjacent each curved section a propelling mechanism for positively advancing the pallets around the adjacent curved section from one run to the other, a clasp carried by the first pallet of each pallet train, a catch releasably engagable with a clasp and carried by the last pallet of each train, each clasp being constructed so that it engages with the catch carried by an immediately succeeding pallet to couple the pallets together as their associated train is advanced along at least one of the runs, and each clasp and catch being constructed so that as each pallet having a clasp is initially advanced by the propelling mechanism around one of the curved sections it disengages from the catch of the immediately succeeding pallet, whereby as each pallet is advanced around a curved section it is disconnected from all other pallets, and each catch comprises a block having a ramp inclined generally upwardly at an acute included angle relative to its associated pallet when received on the upper run and an abutment adjacent and below the upper end of the ramp, and each clasp comprises a yieldably biased follower engagable with the ramp of the catch as the catch is advanced under the follower and movable into releasable engagement with the abutment.

10. The conveyor of claim 2 wherein each catch comprises a block having a ramp inclined generally upwardly at an acute included angle relative to its associated pallet when received on the upper run and an abutment adjacent and below the upper end of the ramp, and each clasp comprises a yieldably biased follower engagable with the ramp of the catch as the catch is advanced under the follower and movable into releasable engagement with the abutment.

11. The conveyor of claim 3 wherein each catch comprises a block having a ramp inclined generally upwardly at an acute included angle relative to its associated pallet when received on the upper run and an abutment adjacent and below the upper end of the ramp, and each clasp comprises a yieldably biased follower engagable with the ramp of the catch as the catch is advanced under the follower and movable into releasable engagement with the abutment.

12. The conveyor of claim 4 wherein each catch comprises a block having a ramp inclined generally upwardly at an acute included angle relative to its associated pallet when received on the upper run and an abutment adjacent and below the upper end of the ramp, and each clasp comprises a yieldably biased follower engagable with the ramp of the catch as the catch is advanced under the follower and movable into releasable engagement with the abutment.

13. The conveyor of claim 7 wherein each catch comprises a block having a ramp inclined generally upwardly at an acute included angle relative to its associated pallet when received on the upper run and an abutment adjacent and below the upper end of the ramp, and each clasp comprises a yieldably biased follower engagable with the ramp of the catch as the catch is advanced under the follower and movable into releasable engagement with the abutment.

14. The conveyor of claim 1 wherein the propelling mechanism comprises a driven sprocket with a plurality of teeth and disposed between the runs and adjacent each curved section and a dog carried by each pallet adjacent the underside thereof and having a member yieldably engagable in the space between any two adjacent teeth of the sprocket for advancing its associated pallet around the curved section associated with the driven sprocket.

15. An endless accumulating conveyor comprising laterally spaced apart endless multi-strand conveyor chains having upper and lower runs connected adjacent the ends of the conveyor by curved sections with return bends thereof, laterally spaced coaxial conveyor sprockets at each end of the conveyor for supporting the curved sections of the chains, a plurality of pallet trains each for carrying a workpiece and each having at least a leading first pallet and a trailing last pallet, a first workpiece support on the first pallet, a second workpiece support on the last pallet and the first and second supports together carrying the same workpiece on one train of pallets with the workpiece having a length greater than the length of any one pallet, each pallet being slidably supported on the chains and adapted to be frictionally transported over the upper and lower runs, propelling mechanism for positively engaging and positively advancing without slippage therebetween the pallets one at a time over the curved sections in a an arcuate path from one run to the other, a clasp carried by the first pallet of each pallet train, a catch releasably engagable with a clasp and carried by the last pallet of each train, each clasp being constructed so that it engages with the catch carried by an immediately succeeding pallet to couple the pallets together as their associated train is advanced along at least one of the runs for carrying a workpiece, and each clasp and catch is constructed so that as each pallet having a clasp is initially advanced by the propelling mechanism around one of the curved sections it disengages from the catch of the immediately succeeding pallet and as each pallet is advanced in an arcuate path around a curved section it is disconnected from all other pallets and is the only pallet being moved by its associated propelling mechanism around the curved section.

16. An endless accumulating conveyor comprising, laterally spaced apart and parallel linear members providing an upper run and a lower run, curved sections at the ends of the runs to provide a continuous path with return bends for pallets, a plurality of pallet trains each having at least a leading first pallet and a trailing last pallet, each pallet being movably supported on said linear members and each adapted to be advanced along said upper and lower runs and around the curved sections, adjacent each curved section a propelling mechanism for positively advancing the pallets around the adjacent curved section in an arcuate path from one run to the other, a clasp carried by the first pallet of each pallet train, a catch releasably engagable with a clasp and carried by the last pallet of each train, each clasp being constructed so that it engages with the catch carried by an immediately succeeding pallet to couple the pallets together as their associated train is advanced along at least one of the runs, and each clasp and catch being constructed so that as each pallet having a clasp is initially advanced by the propelling mechanism around one of the curved sections it disengages from the catch of the immediately succeeding pallet, whereby as each pallet is advanced around a curved section it is disconnected from all other pallets, and the clasp comprises a permanent magnet pivotally carried by the first pallet of each pallet train and the catch comprises a block of ferro-magnetic material releasably engagable with a clasp and carried by the last pallet of each train.

17. The conveyor of claim 15 which also comprises for each pallet train at least one intermediate pallet received between the first and the last pallet of the train, a clasp carried by each intermediate pallet and a catch carried each intermediate pallet.

18. The conveyor of claim 15 wherein the clasp carried by each first pallet is disposed adjacent the trailing edge thereof and the catch carried by each last pallet is disposed adjacent the leading edge thereof.

19. The conveyor of claim 15 which also comprises an escapement mechanism immediately adjacent the lower run and upstream of and adjacent a curved section, and constructed and arranged to release one pallet at a time for being advanced around the adjacent curved section while retaining an immediately succeeding pallet while the released pallet is being advanced completely around the adjacent curved section.

20. The conveyor of claim 19 which also comprises a second escapement mechanism immediately adjacent the upper run and and upstream of and adjacent an associated curved section and constructed and arranged to release one pallet at a time to be advanced around the associated curved section while retaining an immediately succeeding pallet at least until the released pallet has been advanced completely around the associated curved section.

21. The conveyor of claim 15 which also comprises an escapement mechanism immediately adjacent the upper run and upstream of and adjacent an associated curved section and constructed and arranged to release one pallet at a time to be advanced around the curved section while retaining an immediately succeeding pallet at least until the released pallet has been advanced completely around the associated curved section.

22. An endless accumulating conveyor comprising laterally spaced apart endless multi-strand conveyor chains having upper and lower runs connected adjacent the ends of the conveyor by curved sections with return bends thereof, laterally spaced coaxial conveyor sprockets at each end of the conveyor for supporting the curved sections of the chains, a plurality of pallet trains each for carrying a workpiece and each having at least a leading first pallet and a trailing last pallet a first workpiece support on the first pallet, a second workpiece support on the last pallet and the first and second supports together carrying the same workpiece on one train of pallets with the workpiece having a length greater than the length of any one pallet, each pallet being slidably supported on the chains and adapted to be frictionally transported over the upper and lower runs, propelling mechanism for positively engaging and positively advancing without slippage therebetween the pallets one at a time over the curved sections in an arcuate path from one run to the other, a clasp carried by the first pallet of each pallet train, a catch releasably engagable with a clasp and carried by the last pallet of each train, each catch comprises a block having a ramp inclined generally upwardly at an acute included angle relative to its associated pallet when received on the upper run and an abutment adjacent and below the upper end of the ramp, each clasp comprises a yieldably biased follower engagable with the ramp of the catch as the catch is advanced under the follower and movable into releasable engagement with the abutment, each clasp being constructed so that it engages with the catch carried by an immediately succeeding pallet to couple the pallets together as their associated train is advanced along at least one of the runs for carrying a workpiece, and each clasp and catch is constructed so that as each pallet having a clasp is initially advanced by the propelling mechanism around one of the curved sections it disengages from the catch of teh immediately succeeding pallet and as each pallet is advanced in an arcuate path around a curved section it is disconnected from all other pallets and is the only pallet being moved by its associated propelling mechanism around the curved section.

23. The conveyor of claim 15 wherein each clasp comprises one of a permanent magnet and a block of a ferromagnetic material releasably engagable with the magnet, and the catch comprises the other of the permanent magnet and the block.

24. An endless accumulating conveyor comprising laterally spaced apart endless multi-strand conveyor chain having upper and lower runs connected adjacent the ends of the conveyor by curved sections with return bends thereof, laterally spaced coaxial conveyor sprockets at each end of the conveyor for supporting the curved sections of the chains, a plurality of pallet trains each for carrying a workpiece and each having at least a leading first pallet and a trailing last pallet, a first workpiece support on the first pallet, a second workpiece support on the last pallet and the first and second supports together carrying the same workpiece on one train of pallets with the workpiece having a length greater than the length of any one pallet, each pallet being slidably supported on the chains and adapted to be fictionally transported over the upper and lower runs, propelling mechanism for positively engaging and positively advancing without slippage therebetween the pallets one at a time over the curved sections in a an arcuate path from one run to the other, a clasp carried by the first pallet of each pallet train, a catch releasably engagable with a clasp and carried by the last pallet of each train, the clasp comprises a permanent magnet pivotally carried by one of the first and last pallets of each pallet main and the catch comprises a block of ferromagnetic material releasably engagable with a clasp and carried by the other of the first and last pallets of each train, each clasp being constructed so that it engages with the catch carried by an immediately succeeding pallet to couple the pallets together as their associated train is advanced along at least one of the runs for carrying workpiece and each clasp and catch is constructed so that as each pallet having clasp is initially advanced by the propelling mechanism around one of the curved sections it disengages from the catch of the immediately succeeding pallet and as each pallet is advanced in an arcuate path around a curved section it is disconnected from all other pallets and is the only pallet being moved by its associated propelling mechanism around the curved section.

25. The conveyor of claim 1 wherein each clasp comprises one of a permanent magnet and a block of a ferromagnetic material releasably engagable with the magnet, and the catch comprises the other of the permanent magnet and the block.

26. An accumulating conveyor of comprising, laterally spaced apart and parallel linear members providing an upper run and a lower run, plurality of pallet train each for carrying a workpiece and each having at least a leading first pallet and a trailing last pallet, a first workpiece support on the first pallet, a second workpiece support on the last pallet and the first and second supports together carrying the same workpiece on one train of pallets with the workpiece having a length greater than the length of any one pallet, each pallet being movably supported on said linear members and adapted to be advanced on said upper and lower runs, a transfer mechanism adjacent each end for positively engaging and positively transferring the pallets without slippage therebetween one at a time in an arcuate path with a return bend from one run to the other, a clasp carried by the first pallet of each pallet train, a catch releasably engagable with a clasp and carried by the last pallet of each train, each clasp being constructed so that it engages with the catch carried by an immediately succeeding pallet to couple the pallets together as their associated train is advanced along at least one of the runs, and each clasp and catch being constructed so that as each pallet having a clasp is transferred by the transfer mechanism from one run to the other it is disengaged from the catch of the immediately succeeding pallet and as each pallet is transferred in an arcuate path from one run to the other it is disconnected from all other pallets and is the only pallet being moved by its associated transfer mechanism as it is moved along the arcuate path from one run to another.

27. The conveyor of claim 26 which also comprises for each pallet train at least one intermediate pallet received between the first and the last pallets of the train, a clasp carried by each intermediate pallet and a catch carried each intermediate pallet.

28. The conveyor of claim 26 which also comprises an escapement mechanism immediately adjacent the lower run and upstream of and adjacent a transfer mechanism, and constructed and arranged to release one pallet at a time to be transferred from the lower run to the upper run while retaining an immediately succeeding pallet while the released pallet is being transferred to the upper run.

29. The conveyor of claim 28 which also comprises a stop mechanism immediately adjacent the upper run and downstream from the last mentioned transfer mechanism and constructed and arranged to releasably stop the first pallet of each train while all succeeding pallets of such train become coupled therewith by their associated catches and latches and thereafter to release the first pallet to permit the entire pallet train to be advanced downstream of the stop mechanism.

30. The conveyor of claim 29 which also comprises a second escapement mechanism immediately adjacent the upper run and upstream of and adjacent an associated transfer mechanism and constructed and arranged to release one pallet at a time to be transferred from the upper run to the lower run while retaining an immediately succeeding pallet at least until the released pallet has been completely transferred to the lower run.

31. The conveyor of claim 26 which also comprises an escapement mechanism immediately adjacent the upper run and upstream of and adjacent an associated transfer mechanism and constructed and arranged to release one pallet at a time to be transferred from the upper run to the lower run while retaining an immediately succeeding pallet at least until the released pallet has been completely transferred to the lower run.

32. The conveyor of claim 9 which comprises for each pallet train at least one intermediate pallet received between the first and the last pallets of the train, a clasp carried by each intermediate pallet and a catch carried each intermediate pallet.

33. The conveyor of claim 9 wherein the clasp carried by each first pallet is disposed adjacent the trailing edge thereof and the catch carried by each last pallet is disposed adjacent the leading edge thereof.

34. The conveyor of claim 9 which also comprises an escapement mechanism immediately adjacent the lower run and upstream of and adjacent a curved section, and constructed and arranged to release one pallet at a time for being advanced around the adjacent curved section while retaining an immediately succeeding pallet while the released pallet is being advanced completely around the adjacent curved section.

35. The conveyor of claim 34 which also comprises a second escapement mechanism immediately adjacent the upper run and upstream of and adjacent an associated curved section and constructed and arranged to release one pallet at a time to be advanced around the associated curved section while retaining an immediately succeeding pallet at least until the released pallet has been advanced completely around the associated curved section.

36. The conveyor of claim 34 which also comprises a stop mechanism immediately adjacent the upper run and downstream from the aforementioned curved section and constructed and arranged to releasably stop the first pallet of each train while all succeeding pallets of such train become coupled therewith by their associated catches and latches and thereafter to release the first pallet to permit the entire pallet train to be advanced downstream of the stop mechanism.

* * * * *

UNITED STATES PATENT AND TRADEMARK OFFICE
CERTIFICATE OF CORRECTION

PATENT NO. : 6,047,813
DATED : April 11, 2000
INVENTOR(S) : Hans W. Herzog, Kenneth B. Lingo, John H. Nolan It is certified that error appears in the above-identified patent and that said Letters Patent is hereby corrected as shown below:

Title page,
Item [75] Inventor, second named inventor should be -- Kenneth B. Lingo --.

Column 9,
Line 21, after "carried" insert -- by --.

Column 10,
Line 4, after "pallets" insert a comma -- , --.

Column 11,
Line 63, delete "pallets" insert -- claim 16 --.
Line 66, after "carried" (second occurrence, insert -- by --.

Column 12,
Line 1, 5, and 20, delete "claim 15" and insert -- claim 16 --.
Line 62, delete "" and insert -- the --.

Column 13,
Line 7, delete "chain" and insert -- chains --.
Line 23, delete "a" (second occurrence)
Line 28, delete "main" and insert -- train --.
Line 48, delete "of".
Line 50, before "plurality" insert -- a --.
Line 50, delete "train" and insert -- trains --.

UNITED STATES PATENT AND TRADEMARK OFFICE
CERTIFICATE OF CORRECTION

PATENT NO.    : 6,047,813
DATED         : April 11, 2000
INVENTOR(S)   : Hans W. Herzog/Kenneth B. Lingo/John H. Nolan It is certified that error appears in the above-identified patent and that said Letters Patent is hereby corrected as shown below:

<u>Column 14,</u>
Line 13, after "carried" (second occurrence) insert -- by --.
Line 50, after "carried" insert -- by --.

Signed and Sealed this

Twenty-sixth Day of March, 2002

Attest:

JAMES E. ROGAN
*Attesting Officer*    *Director of the United States Patent and Trademark Office*

UNITED STATES PATENT AND TRADEMARK OFFICE
CERTIFICATE OF CORRECTION

PATENT NO.     : 6,047,813
DATED          : April 11, 2000
INVENTOR(S)    : Hans W. Herzog, Kenneth B. Lingo and John H. Nolan It is certified that error appears in the above-identified patent and that said Letters Patent is hereby corrected as shown below:

<u>Title page,</u>
Item [75] Inventor, second named inventor should be -- Kenneth B. Lingo --.

<u>Column 9,</u>
Line 21, after "carried" insert -- by --.

<u>Column 10,</u>
Line 4, after "pallets" insert a comma -- , --.

<u>Column 11,</u>
Line 63, delete "claim 15" insert -- claim 16 --.
Line 66, after "carried" (second occurrence), insert -- by --.

<u>Column 12,</u>
Line 1, 5, and 20, delete "claim 15" and insert -- claim 16 --.
Line 62, delete "teh" and insert -- the --.

<u>Column 13,</u>
Line 7, delete "chain" and insert -- chains --.
Line 23, delete "a" (second occurrence)
Line 28, delete "main" and insert -- train --.
Line 48, delete "of".
Line 50, before "plurality" insert -- a --.
Line 50, delete "train" and insert -- trains --.

UNITED STATES PATENT AND TRADEMARK OFFICE
CERTIFICATE OF CORRECTION

PATENT NO.    : 6,047,813
DATED         : April 11, 2000
INVENTOR(S)   : Hans W. Herzog, Kenneth B. Lingo and John H. Nolan It is certified that error appears in the above-identified patent and that said Letters Patent is hereby corrected as shown below:

<u>Column 14,</u>
Line 13, after "carried" (second occurrence) insert -- by --.
Line 50, after "carried" insert -- by --.

This certificate supersedes Certificate of Correction issued March 26, 2002.

Signed and Sealed this

Twenty-fifth Day of November, 2003

JAMES E. ROGAN
*Director of the United States Patent and Trademark Office*